Patented June 8, 1937

2,083,285

UNITED STATES PATENT OFFICE 2,083,285

CARRIER COMPRISING A DIAZONIUM COMPOUND AND METHOD OF OBTAINING CONTRASTS

Roelof Jan Hendrik Alink, Eindhoven, Netherlands, assignor to N. V. Philips' Gloeilampenfabrieken, Eindhoven, Netherlands No Drawing. Application September 24, 1934, Serial No. 745,347. In Germany October 9, 1933

7 Claims. (Cl. 95—6)

This invention relates to a method of obtaining contrasts with the aid of light, and to a light-sensitive material comprising a diazonium compound.

The copending U. S. application of de Boer et al. Ser. No. 612,364, filed May 19, 1932, now Patent No. 2,034,508 dated March 17, 1936, describes a method for obtaining contrasts with the aid of light, which method consists in using a carrier provided with a benzenediazonium compound (or a plurality of such benzenediazonium compounds), which upon exposure in the presence of water primarily forms a phenol which is so substituted in the benzene nucleus that this phenol can be oxidized to form a colored compound by the benzenediazonium compound itself or by another benzenediazonium compound also present in the carrier, the medium of the carrier being of such a nature that the speed of the oxidation process is higher than that at which the benzenediazonium compound couples with the phenol to form an azo coloring matter, but which oxidation process during the exposure proceeds more slowly than the conversion of the benzenediazonium compound by the said exposure and that after this exposure the phenol is caused to be oxidized to form a colored oxidation product by the diazonium compound not yet converted.

The above-mentioned patent includes also a method of making positive prints from positives by using a carrier comprising a benzenediazonium compound, which after local exposure is caused to form a coloring matter, which is not an azo-coloring matter, simply by exposing it to the atmospheric air. In accordance to whether this air is more or less damp, the self-development proceeds more or less quickly.

This method does not use the coupling properties of diazonium compounds, but is based on the oxidation properties of definite diazonium compounds, which properties will be more clearly understood by reference to an example.

When exposing, for instance, parahydroxybenzenediazoniumchloride (as is well known the usual carriers, for instance, paper always contain sufficient water to give rise to the occurrence of an OH-group) there is formed therefrom hydrochinone, nitrogen and hydrochloric acid according to the equation:

If the exposure is made in such a manner that only part of the available diazonium compound has been converted into hydrochinone, the light-decomposition product thus obtained is oxidized by the diazonium compound remaining on the carrier to form a colored oxidation product.

As examples of diazonium compounds adapted for carrying out said method, the above-mentioned patent mentions: parahydroxybenzenediazoniumchloride, orthohydroxybenzenediazoniumchloride, 1-hydroxy-2-diazo-4-benzenesulphonic acid, paraphenylaminobenzene-diazoniumchloride and orthophenoldiazoniumsulfate, and furthermore it states that it may be advantageous to give the carrier a content of copper nitrate.

Again, the above-mentioned patent states that the durability against the action of daylight of the oxidation products present on the finished drawing is generally larger than that of azo-coloring materials, and furthermore that yellowing of the base occurring with many methods by air oxidation of the light-decomposition products occurs to a much smaller extent with the said method.

With the further development of this method it is of importance to endeavor to obtain oxidation products whose durability against the action of daylight, and also against the action of air, moisture, carbonic acid, etc., is as great as possible, and furthermore the light decomposition products, present on the so-called "copied on" parts must be as white as possible and must remain so upon exposure to daylight and atmospheric influences. In order that the contrast obtained is as great as possible it is desired that the light-decomposition products are white and furthermore that the oxidation products are colored as dark as possible. As appears already from the examples of the above-mentioned patent, the different oxidation products exhibit different colors. For different purposes different colors will be preferred, a red brown tone being often of importance for artistic drawings, a violet tone for sketch drawings, whereas for shop drawings very often a tone is desired which is as black as possible.

Furthermore, it is desired that the light sensitive diazonium compounds themselves in their pure state have a sufficient stability against water in order that the solutions to be used in the course of manufacture of the light sensitive materials do not exhibit decomposition phenomena and furthermore that the light sensitive materials in their non-exposed state have a proper stability.

Further experiments have proved that the endeavors made to obtain very durable oxidation and light-decomposition products, and in addition a good contrast and especially diazonium compounds having a great durability to water are highly furthered by selecting representatives of the group of benzenediazonium compounds, in which one or more hydrogen atoms of the benzene nucleus are substituted by at least one alkyl- or aryl-group. Furthermore, the invention materially widens the choice of the desired tone of the oxidation products as will be set out more fully with reference to various embodiments.

A. Embodiments relating to the manufacture of positive prints from positives 1. 10 gms. of aniline are converted, according to Clarke "Organic Synthesis", vol. III, page 7, with 228 gms. of p-phenol-sulphonic-acid potassium to form 2-oxy-azobenzol-5-sulphonic acid potassium.

10 gms. of this azo compound are converted, according to Beilstein XIV, page 853, with stannochloride and hydrochloric acid into the 4:4'-diamino-3-oxydiphenyl-6-sulphonic acid.

2 gms. of this diamine are diazotized in a hydrochloric acid solution with 1 mol. $NaNO_2$ (0.4 gm.) whilst cooling, for instance, with ice. By partial concentration by evaporation of the brown solution, a diazo compound crystallizes, which has probably the following composition: HCl-salt of 4' amino-4-diazonium-3-oxydiphenyl-6-sulphonic acid.

Paper is soaked in a ½% solution of this monodiazonium compound in water, to which 1 mol. $Cu(NO_3)_2 \cdot 6H_2O$ is added. After being dried, the paper is exposed beneath a drawing on transparent paper for 3 minutes to the light of a 5 kw. incandescent lamp disposed at a distance of 25 cm., and is then placed in a damp atmosphere in the dark. The image thus formed exhibits violet lines on a light base.

2. Paper is soaked in a solution of ½% o-methyl-o-diazophenol-p-sulphonic acid +1.3% $Cu(NO_3)_2 \cdot 6H_2O$.

In an air-dry state this paper is exposed beneath a tracing for 3 minutes to the light of a 5 kw. electric incandescent lamp disposed at a distance of 25 cm. from the tracing. Upon the self-development in the dark in the presence of water vapor a violet-brown positive image ensues. Without $Cu(NO_3)_2$ the image exhibits a yellowish orange tone.

The durability of the solution of this diazonium compound is greater than that of the diazophenol-p-sulphonic acid referred to in the above-mentioned patent. This also holds good for the solution to which $Cu(NO_3)_2$ is added.

3. If, instead of the orthomethyl compound of Example 2, 1-hydroxy-2-diazo-5-methyl-4-benzene sulphonic acid is used, then after the exposure and the self-development in the dark, a dark blue positive or negative image ensues in accordance to whether the print is exposed a long time (3 minutes) or a short time (15 seconds). The image exhibits a remarkably fresh tone.

The introduction of the methyl-group in meta-position ensures a greater durability of the diazonium compound both in the solution and in the paper relatively to the o-methyl compound.

This metamethyldiazonium compound lends itself admirably for carrying out the negative heliographic printing process, since the oxidation coloring matter, after exposure and development in damp air, is far more insoluble than that of the o-diazophenol-p-sulphonic acid referred to in the above-mentioned patent so that fixation can be readily effected by rinsing.

If the $Cu(NO_3)_2$ is omitted from the light sensitive solution the oxidation coloring matter becomes orange red.

An important property is the low solubility of the m-methyl compound in water, viz. about 0.5% relatively to the high solubility of o-diazophenol-p-sulphonic acid, which is about 12%. In fact, this enables, with the negative heliographic printing process, the self-development and the fixation to be effected in one operation. With this operation the speed at which the dissolution of the diazonium compound occurs is such that during this process a sufficient quantity of diazonium compound remains to form the oxidation coloring matter.

In order to increase the solubility of the diazonium compound mentioned in the 4th example, α naphtalenesulphonic acid sodium may be used in a ratio of 1 mol. of this compound to 1 mol. of the diazonium compound. A similar effect can also be obtained by adding ¾ mol. of sodium bicarbonate. It is also possible to increase the solubility by first introducing the copper nitrate into the solution and then introducing the diazonium compound.

When exposing with very hot light sources, direct image production occurs less slowly than with o-diazo-phenol-p-sulphonic acid, in other words by the heat of the light source the speed of oxidation in this case is not increased to such a high degree relatively to the speed of decomposition of the m-methyl compound that copying out to white would be impeded thereby.

The speed of self-development at room temperature substantially corresponds to that with o-diazophenol-p-sulphonic acid.

4. 23 gms. of 1-oxy-2-nitrobenzol-4-sulphonic acid-sodium are dissolved in a solution of 40 gms. of KOH in 300 c. c. water. Zinc powder is added to the gently boiling solution till finally a strong foaming and a strong development of hydrogen occurs, whereupon the excess of zinc powder is directly removed by sucking it off into a suction flask containing 200 c. c. concentrated hydrochloric acid. The hydrazo compound formed during the reduction is converted in the solution of hydrochloric acid into a benzidine-derivative, viz. the 3:3'-dioxy-4:4'-diamino-diphenyl-6:6' disulphonic acid. After remaining for two weeks in an icebox, 6 gms. of the compound crystallizes out. After treatment with absorption carbon this compound is recrystallized from water. The obtained product (3.5 gms.) is white crystalline.

These crystals are suspended in 6 c. c. concentrated HCl+6 c. c. water and diazotized while adding 2 gms. of $NaNO_2$ in 8 c. c. water at 5° C. The crystals dissolve and after diazotization the diazo compound crystallizes out to an amount of 2½ gms.

Paper is soaked in ½% solution of 3:3'-dioxy-4:4'-diazodiphenyl-6:6' disulphonic acid in water which contains 1.35% $Cu(NO_3)_2 \cdot 6H_2O$ and after that it is strongly dried with the aid of air dried by $P_2O_5$. The paper is then exposed beneath a transparent drawing for 3 minutes to the light of a 5 kw. incandescent lamp placed at a distance of 25 cm. The development is effected by exposing the paper to damp air after the exposure. The image exhibits a steel blue tone. Without $Cu(NO_3)_2$ the image is colored orange brown.

5. m-nitrobenzenesulphonic acid potassium is converted into 4:4'-diamino-diphenyl-2:2'-disulphonic acid in the manner set out in Beilstein XIV page 794 (1931) and after that it is diazotized in the manner described therein.

15 gms. of 4:4' didiazo-diphenyl-2:2' disulphonic acid is suspended in 190 c. c. water+10 c. c. concentrated $H_2SO_4$ (spec. gravity 1.84) and decomposed by introducing steam. After concentration by evaporation to about 40 c. c. solution, 7 gms. of $KNO_3$+7 c. c. strong HCl (spec. gravity 1.19) is added and heated till nitration occurs, whereupon the heating is stopped and the nitration proceeds automatically. After that the liquid is concentrated by evaporation till a sirupy mass is obtained which is reduced in a boiling solution of 35 gms. of stannochloride+35 c. c. strong HCl.

After cooling and sucking off, the filtrate is diluted with water and $H_2S$ is introduced in order that the tin is completely precipitated. After filtering, the mother liquor is concentrated by evaporation thus obtaining 4 gms. of 5:5'-diamino-4:4' dioxy-diphenyl-2:2'-disulphonic acid.

This quantity is dissolved in 40 c. c. water and diazotized with 2.5 gms. of $NaNO_2$ in 10 c. c. water. After remaining several hours in ice, 100 gms. of didiazo compound crystallizes. After concentration by evaporation in an exciccator the mother liquor still produced 700 mgms. of the didiazo compound.

Paper is soaked in ½% 5:5'-didiazo-4:4'-dioxydiphenyl - 2:2' - disulphonic acid+1.35% $Cu(No_3)_2.6H_2O$ solution in water, and is then strongly dried by means of air which has been dried by $P_2O_5$. After exposure and subsequent development in damp air, a positive image exhibiting a blue violet tone ensues. Without $Cu(NO_3)_2$ the color of the image is light brownish red.

6. 23 gms. of o-nitro-o-cresol-p-sulphonic acid are suspended in 200 c. c. water and are neutralized with 14.5 gms. of $Na_2CO_3.10H_2O$, whereupon 40 gms. of KOH in 100 c. c. water is added and reduced in the solution with zinc while boiling till the initially reddish brown solution has become entirely colorless. After sucking off the excess of zinc in a flask containing 200 c. c. of strong HCl (spec. gravity 1.19)+ 50 c. c. water, it is cooled down, whereupon a very voluminous crystalline precipitate ensues which is sucked off with water and subsequently washed out with alcohol. The yield is 11 gms. (fine needles). After suspending the product obtained in 40 c. c water and after adding 12.5 cm. HCl (spec. gravity 1.19), it is diazotized with a solution of 3.5 gms. of $NaNO_2$ in 15 c. c. water. After decolorizing with absorption carbon the yellow solution is concentrated by evaporation in a vacuum. The diazo compound crystallizes in small yellow columns, yield 7 gms.

Paper is soaked in a ½% solution of 2:2'-dimethyl-3:3'-dioxy-4:4' didiazo-diphenyl-6:6'-disulphonic acid+1.3% $(Cu(NO_3)_2.6H_2O$ in water. By exposing the paper in air-dry state beneath a transparent drawing for three minutes to the light of a 5 kw. electric incandescent lamp disposed at a distance of 25 cm. and subsequent treatment with water vapor in the dark, a drawing exhibiting lilac-brown lines ensues.

Without $Cu(NO_3)_2$ the tone is yellow.

B. *Embodiments relating to photographic application in a limited sense*

In Examples 2 and 4, it has already been set out how the invention permits of obtaining negative prints from positives with a printing process. In the following examples negatives are also obtained from positives, and the carriers used are obtained by providing different materials, such as glass, paper and film, with a colloidal layer.

7. Paper provided with a casein layer is impregnated with a 1% solution of o-methyl-o-diazophenol-p-sulphonic acid+3% $Cu(NO_3)_2.6H_2O$ in water and subsequently dried in the air.

The light sensitive material is exposed beneath a photographic negative for 7½ minutes to the light of an electric incandescent lamp comprising a reflector (220 v., 500 w.), or is exposed for ¼ to ½ minute to sunlight. Subsequently the exposed material, before being rinsed, is allowed to remain for at least 24 hours in the dark in a damp atmosphere, and thereupon it is rinsed with water, whereby a sharp image is obtained. For the sake of completeness it should be remarked that the greater part of the oxidation coloring matter is washed away, and furthermore that also casein dissolves when rinsing with water directly after the exposure. By a long treatment with water vapor these difficulties are avoided. What has been observed here for casein paper is also true to a still higher degree for gelatine- or agar agar-paper.

The image obtained has a pleasing dark violet tone whose darkness depends upon the exposure time. The darkest colored images ensue after exposure for 10 minutes to the light of an electric incandescent lamp (220 v., 500 w.) having a reflector and disposed at a distance of 20 m., or after a ½ minute exposure to sunlight. With shorter exposure times the tone is lighter and with longer exposure times the image becomes already slightly negative at points exposed longest.

In accordance with the degree of humidity and the temperature during the exposure, tone variations from brown to violet may occur.

An after-treatment with solutions of sodium bicarbonate or ammonia cannot take place since casein dissolves in these liquids.

8. Paper provided with a layer of gelatine is soaked in a solution of ½% 2 - diazo-1 - oxy - 5 - methylbenzene - 4 - sulphonic acid+ 1.3% $Cu(NO_3)_2.6H_2O$ in water. After drying it is exposed beneath a negative for 25 seconds to the light of a 5 kw. incandescent lamp placed at a distance of 25 cm. After that the exposed material is allowed to remain for 3 hours in a damp atmosphere, so that the image is developed, and thereupon it is bathed for ½ min. in an ammoniacal copper nitrate solution containing 2% $Cu(NO_3)_2.6H_2O$. The fixation, i. e. dissolving of the excess of diazonium compound and the copper salts, is effected by subsequently rinsing the material for ½ hour in running water. Thereupon the carrier is dried while being pressed against glass with the gelatine side contact with the surface of the glass.

The image exhibits a blue tone.

By treating with the ammoniacal copper solution the definition of the image is promoted.

What I claim is

1. As a new photographic material, a carrier provided with a light-sensitive layer comprising as a light-sensitive material a benzene diazonium compound containing a hydroxyl group in ortho-position relative to the diazonium group, a sulphonic acid group in para-position relative to the hydroxyl group and in a meta-position relative to the diazonium group, there being no substituents between the sulphonic acid group and the diazonium group, and one of the radicals selected from the group consisting of methyl and phenyl being present in one of the remaining free places of the nucleus, said diazonium compound having furthermore the following three properties, first, that upon actinic illumination of the layer it forms as a light-decomposition product a phenol which is substituted in the benzene nucleus and is oxidizable by non-decomposed diazonium compound to form colored oxidation products; secondly, that in the milieu of the light-sensitive layer the speed of oxidation of the phenol is greater than the speed at which the diazonium compound could couple with the phenol to form an azo dye; and thirdly, that with a strong actinic illumination the photo-chemical decomposition of the diazonium compound is much faster than is the formation of the colored oxidation products.

2. As a new photographic material, a carrier provided with a light-sensitive layer comprising as a light-sensitive material a compound selected from the group consisting of 1 hydroxy-2-diazo-5-methyl-4-benzene sulphonic acid and 1-hydroxy-2-diazo-6-methyl-4 benzene sulphonic acid, said diazonium compound having furthermore the following three properties, first, that upon actinic illumination of the layer it forms as a light-decomposition product a phenol which is substituted in the benzene nucleus and is oxidizable by non-decomposed diazonium compound to form colored oxidation products; secondly, that in the milieu of the light-sensitive layer the speed of oxidation of the phenol is greater than the speed at which diazonium compounds could couple with the phenol to form an azo dye; and thirdly, that with a strong actinic illumination the photo-chemical decomposition of the diazonium compound is much faster than is the formation of the colored oxidation products.

3. As a new photographic material, a carrier provided with a light-sensitive layer comprising a copper salt and a light-sensitive material, said light-sensitive material being a benzene diazonium compound containing a hydroxyl group in ortho-position relative to the diazonium group, a sulphonic acid group in para-position relative to the hydroxyl group and in meta-position relative to the diazonium group, there being no substituents between the sulphonic acid group and the diazonium group, and one of the radicals selected from the group consisting of methyl and phenyl being present in one of the remaining free places of the nucleus, said diazonium compound having furthermore the following three properties; first, that upon actinic illumination of the layer it forms as a light-decomposition product a phenol which is substituted in the benzene nucleus and is oxidizable by non-decomposed diazonium compound to form colored oxidation products; secondly, that in the milieu of the light-sensitive layer the speed of oxidation of the phenol is greater than the speed at which diazonium compounds could couple with the phenol to form an azo dye; and thirdly, that with a strong actinic illumination the photochemical decomposition of the diazonium compound is much faster than is the formation of the colored oxidation products.

4. The process of making light prints, comprising the steps, forming a light-sensitive layer by applying to a carrier a light-sensitive substance comprising a benzene diazonium compound containing a hydroxyl group in ortho-position relative to the diazonium group, a sulphonic acid group in para-position relative to the hydroxyl group and in meta-position relative to the diazonium group, there being no substituents between the sulphonic acid group and the diazonium group, and one of the radicals selected from the group consisting of methyl and phenyl being present in one of the remaining free places of the nucleus, selectively illuminating said layer with actinic light to partly decompose the diazonium compound on selected weakly-illuminated portions and to form a phenol substituted in the benzene nucleus, oxidizing said phenol by the non-decomposed part of the diazonium compound present at said weakly-illuminated portions at a rate which is greater than the rate at which the diazonium compound could couple with the phenol to form an azo dye and to thereby form on said weakly illuminated portions a colored oxidation product, and substantially completely photochemically decomposing during the exposure to the actinic light the diazonium compound on the strongly-exposed portions at a rate greater than the rate of oxidation of the phenol.

5. The method of manufacturing positive light prints, comprising the steps, forming a light-sensitive layer by applying to a carrier a light-sensitive substance comprising a benzene diazonium compound containing a hydroxyl group in ortho-position relative to the diazonium group, a sulphonic acid group in para-position relative to the hydroxyl group and in meta-position relative to the diazonium group, there being no substituents between the sulphonic acid group and the diazonium group, and one of the radicals selected from the group consisting of methyl and phenyl being present in one of the remaining free places of the nucleus, selectively illuminating said layer with a strong actinic light to substantially completely decompose the diazonium compound at the strongly-illuminated portions into uncolored decomposition products and to partly decompose the diazonium compound on the weakly-illuminated portions into phenol substituted in the benzene nucleus, and subjecting the layer to an indifferent atmosphere containing moisture to oxidize the phenol by the non-decomposed diazonium compound at the weakly-illuminated portions and to form thereon a colored oxidation product which is not an azo dye.

6. The method of manufacturing positive light prints, comprising the steps, forming a light-sensitive layer by applying to a carrier a light-sensitive substance comprising a benzene diazonium compound containing a hydroxyl group in ortho-position relative to the diazonium group, a sulphonic acid group in para-position relative to the hydroxyl group and in meta-position relative to the diazonium group, there being no substituents between the sulphonic acid group and the diazonium group, and one of the radicals selected from the group consisting of a methyl and phenyl being present in one of the remaining free places of the nucleus, selectively illuminating said layer with a strongly actinic light to substantially completely decompose the diazonium compound at the strongly-illuminated portions into uncolored decomposition products, and to partly decompose the diazonium compound on the weakly-illuminated portions to form phenol substituted in the benzene nucleus, and subjecting the layer to moderate heating and to an indifferent atmosphere containing moisture to oxidize the phenol by the non-decomposed diazonium compound at the weakly-illuminated portions and to form thereon a colored oxidation product which is not an azo dye.

7. The process of making light prints, comprising the steps, forming a light-sensitive layer by applying to a carrier a light-sensitive substance comprising a benzene diazonium compound containing a hydroxyl group in ortho-position relative to the diazonium group, a sulphonic acid group in para-position relative to the hydroxyl group and in meta-position relative to the diazonium group, there being no substituents between the sulphonic acid group and the diazonium group, and one of the radicals selected from the group consisting of methyl and phenyl being present in one of the remaining free places of the nucleus, selectively illuminating said layer with actinic light to partly decompose the diazonium compound on selected weakly-illuminated portions and to form a phenol substituted in the benzene nucleus, oxidizing said phenol by the non-decomposed part of the diazonium compound present at said weakly-illuminated portions at a rate which is greater than the rate at which the diazonium compound could couple with the phenol to form an azo dye and to thereby form on said weakly illuminated portions a colored oxidation product, and photochemically decomposing during the illumination the diazonium compound on the strongly-exposed portions at a rate greater than the rate of oxidation of the phenol.

ROELOF JAN HENDRIK ALINK.